June 23, 1964
G. T. RANDOL
3,138,070
CONTROL VALVE ADAPTED FOR PRESSURE DIFFERENTIAL MOTOR USE
Original Filed Sept. 19, 1957
6 Sheets—Sheet 1
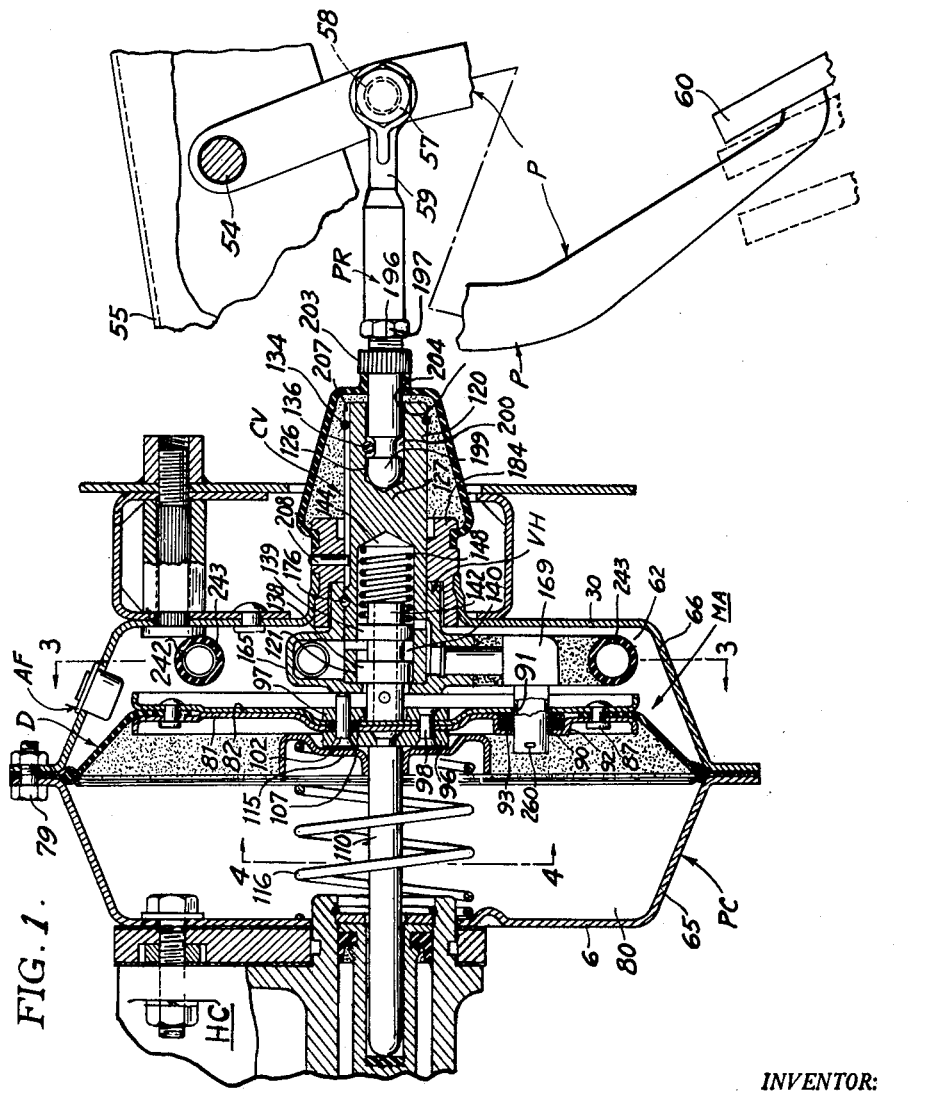
FIG. 1.
INVENTOR:

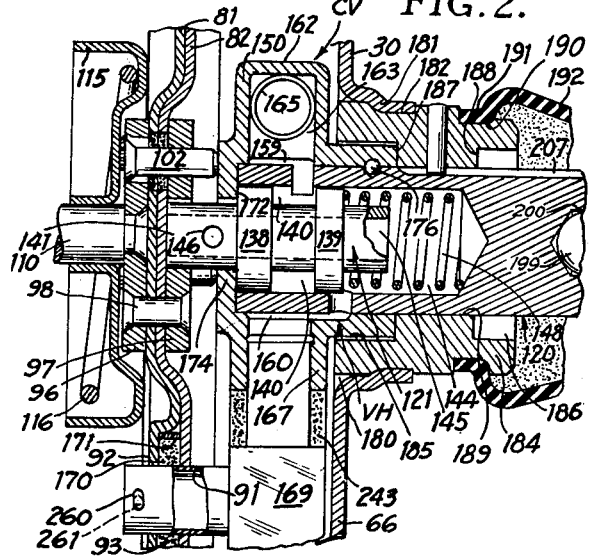
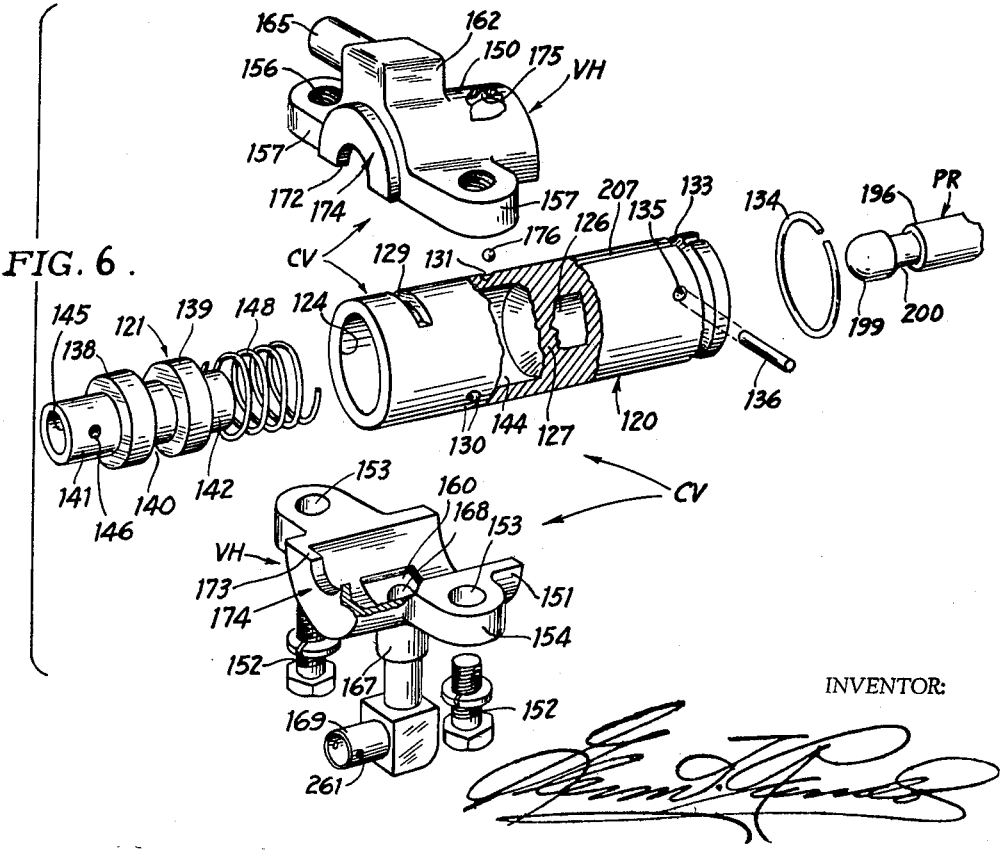

INVENTOR:

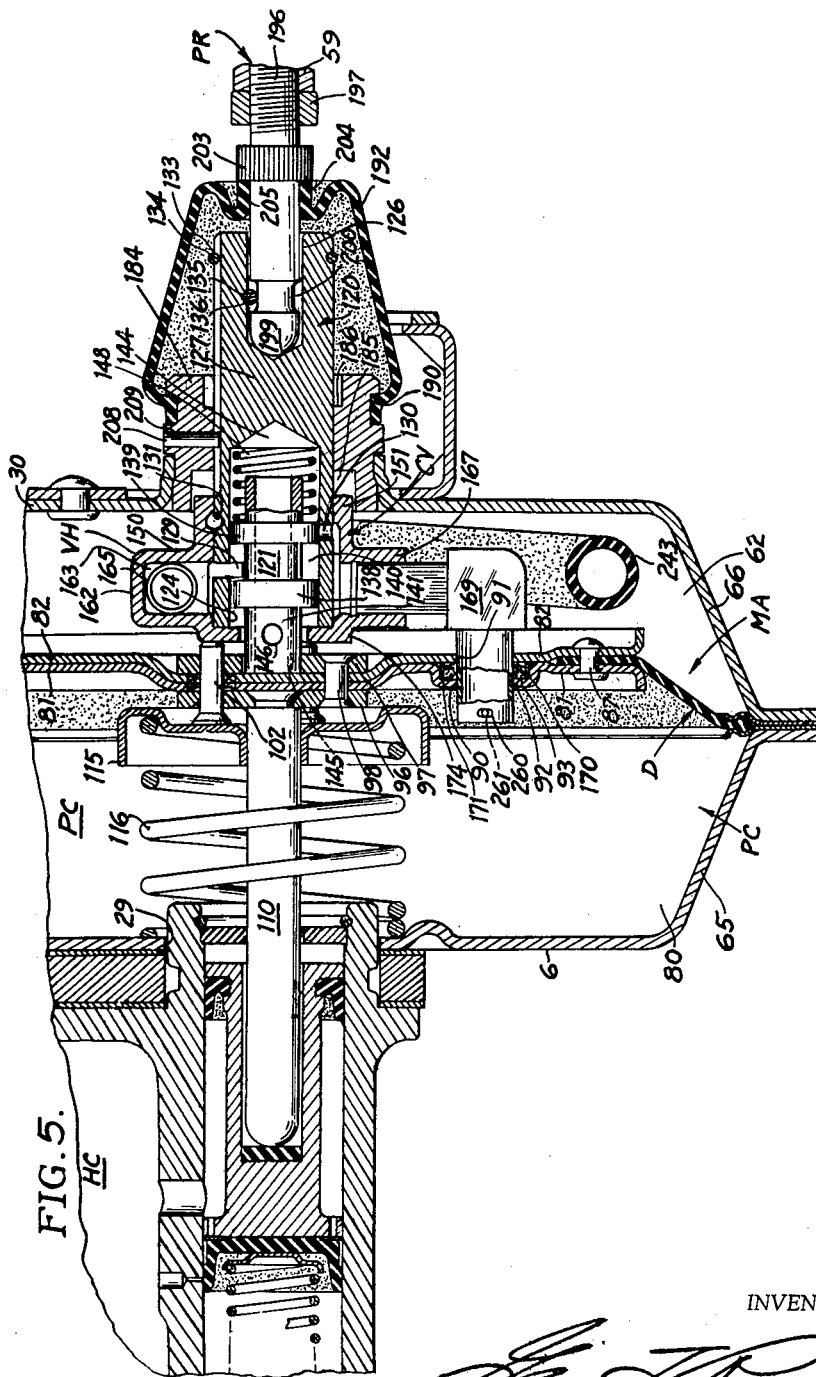

June 23, 1964   G. T. RANDOL   3,138,070
CONTROL VALVE ADAPTED FOR PRESSURE DIFFERENTIAL MOTOR USE
Original Filed Sept. 19, 1957   6 Sheets—Sheet 5
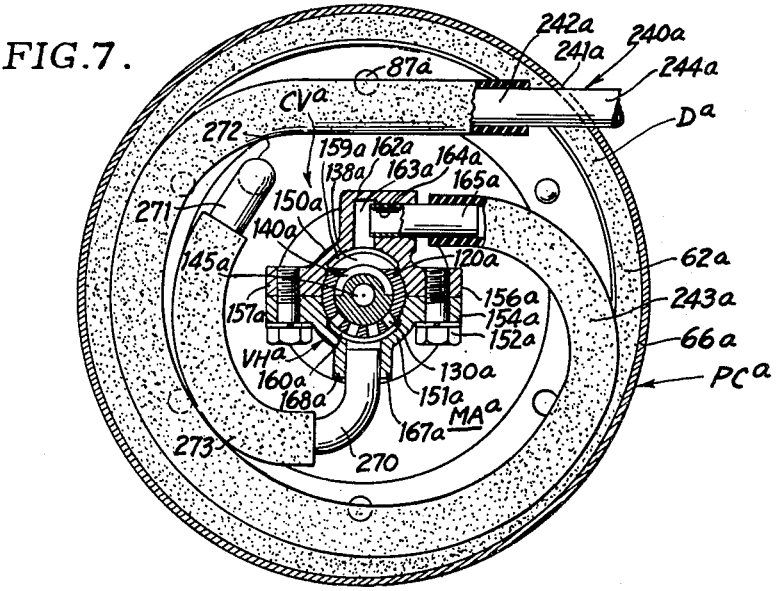
FIG. 7.
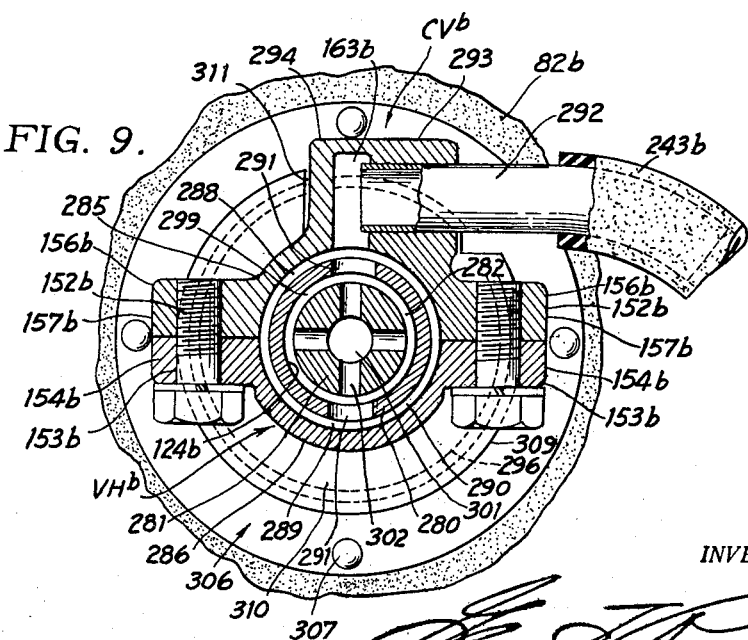
FIG. 9.
INVENTOR:
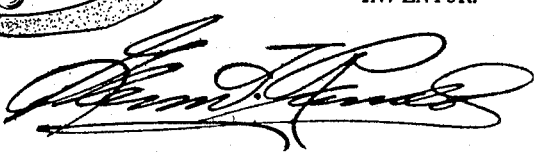

United States Patent Office 3,138,070
Patented June 23, 1964

3,138,070
CONTROL VALVE ADAPTED FOR PRESSURE
DIFFERENTIAL MOTOR USE
Glenn T. Randol, P.O. Box 275, 2nd Ave. and Paull St.,
Mountain Lake Park, Md.
Original application Sept. 19, 1957, Ser. No. 684,946, now
Patent No. 3,101,032, dated Aug. 20, 1963. Divided
and this application May 4, 1961, Ser. No. 107,746
15 Claims. (Cl. 91—378)

This application is a division of my copending application Serial No. 684,946 filed September 19, 1957, now issued to Patent No. 3,101,032 dated August 20, 1963.

In my copending application referred to, I have disclosed a vacuum-operated booster motor having a casing with a power member or wall movable therein, and which, for example, is adapted to operate in part the master cylinder of conventional hydraulic brake systems on automotive vehicles or the like. Activation and inactivation of said power member being under control of novel follow-up valve mechanism comprising at least two principal cooperating elements which are relatively displaceable from normal "off" position wherein the motor is inactivated, to operating "on" position wherein the motor is activated, under influence of an operator-operated member (brake-pedal) opposed by resistance (work load) reacting on said power member. There are certain features of construction and operation which relate particularly to the valve mechanism per se, thus rendering such mechanism applicable for controlling motors of the type under consideration in operative association with systems and/or devices other than those which characterize a vehicular brake system. These features of the valve mechanism per se form the subject-matter of the present application.

The present invention has for a primary objective, the provision of new and improved follow-up valve mechanism operable from said operator member to control operation of said motor, said valve mechanism comprising at least two principal cooperating elements one of which slidably interfits the other, the latter being adapted to operatively support the valve mechanism as a unit on the motor casing independently of said power member, said valve mechanism having the added advantages of a simple, self-contained construction of low-cost, and wherein rigid coaxial disposition of the power member and valve mechanism is preferably eliminated by the aforesaid support thereof on the motor casing, to avoid precision alignment of the casing supports therefor and added costs attendant to numerous machining operations as well.

The valve mechanism referred to in the object next preceding is constructed with four principal elements, three of which cooperate to provide a unitary assembly comprising a two-sectioned housing fixed on a cylindrical sleeve, and the fourth element being a piston telescopically disposed in the valve sleeve for conjoint axial movement with the power member and relatively with respect to said unitary valve assembly to control operation of the said booster motor, said unitary assembly and fourth element being biased apart by spring means to establish the closed (off) disposition of the valve mechanism, said unitary assembly being acted on by said operator member in opposition to said spring means to effect such relative operating movement to dispose the valve mechanism in open (on) disposition. Such relative operating movement of the valve mechanism being accommodated by yielding of said spring means as defined by a predetermined operating clearance normally obtaining between the sleeve and power member when fully released, said clearance when fully taken up enabling direct actuation of said power member by said sleeve under influence of operator force applied to said operator member in cooperation with the output of the booster motor or independently thereof in the event of power failure.

The novel valve mechanism described in the object next above contemplates that the two sections comprising the valve housing may be integrated to produce a unitary housing adapted for a pressfit installation on the valve sleeve for movement as a unit, thereby eliminating clamping of the two separate sections on the sleeve as by a pair of cap bolts as shown.

An object related to the object immediately preceding is to incorporate spring means between said principal interfitting valve elements to establish the normal position thereof and to enable the inner element to have following engagement with the power member to axially move as a unit, the outer element being operator-operated relatively to said inner element in opposition to said spring means to establish said operating position of the valve elements.

A further more specific object related to the two objects next above is the provision of such a valve mechanism wherein the two valve elements comprise an outer cylindrical sleeve and an inner piston telescopically-related and relatively displaceable with the sleeve acted on directly by the operator-operated member, and the piston operatively associated with the power member for movement as a unit in follow-up relationship to the sleeve, the elements being easily fabricated and assembled and free of sealing and alignment problems with respect to one another and the movable power member.

In a modified form of the valve mechanism, a flexible conduit is utilized to interconnect the power member with the side of the valve mechanism opposite to that connected with the source of pressure; while in another modification of the valve mechanism the interior thereof communicates with the power chamber via a longitudinal passageway in the inner valve element.

With these and other objects and advantages in view, the invention consists of the new and novel combinations, constructions, and arrangements of parts as hereinafter more fully described, set forth in the claims appended hereto, and disclosed in the accompanying drawings forming part hereof, wherein:

FIGURE 1 is a longitudinal vertical section of my follow-up control valve mechanism constructed in accordance with the present invention, and exemplarily shown in connection with a differential pressure operator motor utilized to operate in part the master cylinder in an automotive vehicle brake system, the parts being shown in normal released positions;

FIGURE 2 is a fragmentary enlargement of the valve mechanism illustrated in FIGURE 1 to clarify the details thereof;

FIGURE 5 is a section similar to FIGURE 2 on the same scale illustrating an operated disposition of the valve mechanism wherein the control port is about to be "cracked" to induce energization of the motor power assembly to actuate said plunger;

FIGURE 6 is an exploded perspective of the novel follow-up valve mechanism constituting the present invention;

FIGURE 7 depicts a modified fluid connection between the valve mechanism and power member controlled thereby, and comprising a flexible conduit, said view being taken along the same plane as FIGURE 3;

FIGURE 9 is a transverse sectional view taken along the line 9—9 of FIGURE 8 to show particulars of the vacuum-inlet tube mounting and associated structure.

Figure 3:
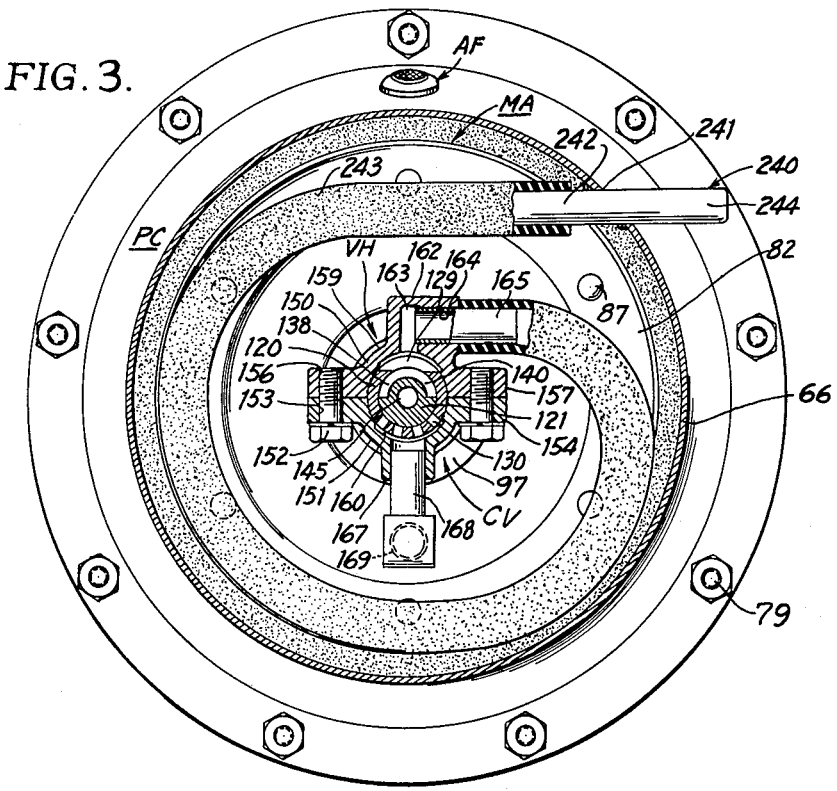
FIGURE 3 is a transverse sectional view taken along the line 3—3 of FIGURE 1, and showing details of the atmospheric side of the movable power member with which said valve mechanism is operatively associated.
Figure 4:
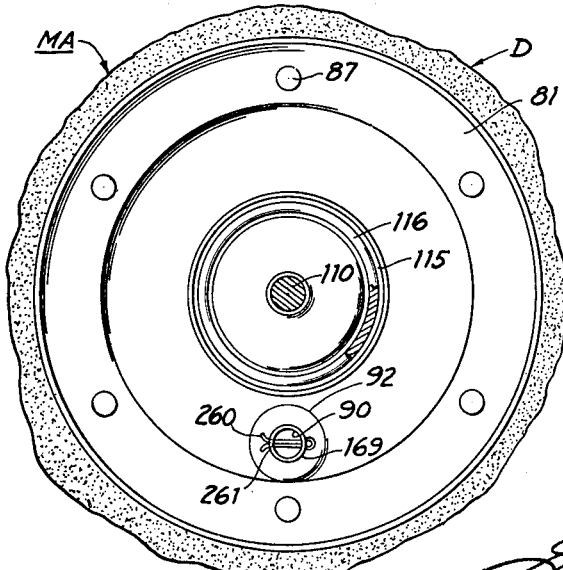
FIGURE 4 is another transverse sectional view taken along the line 4—4 of FIGURE 1, and showing the vacuum-air (power) side of the movable power member and plunger actuated thereby.

Referring now to the drawings wherein like reference characters refer to like and corresponding parts throughout the several views, except in two modified embodiments of the invention wherein similar parts are distinguished, however, by the addition of the suffixes "a" and "b" respectively to each, the illustrative embodiments are disclosed in operative association with a pressure differential operate booster motor also referred to as a power cylinder generally designated "PC" of the air-suspended type, and having a cylindrical casing formed by two cup-shaped shells 65, 66 connected as by bolts 79 projecting through complemental outturned flanges which terminate the open ends of each shell as shown, said casing being fitted with a power member assembly or wall "MA" movable therein from a normally released position to operate in part the master cylinder "HC," for example of the conventional hydraulic brake system on automotive vehicles or the like, said power member dividing the interior of said casing into a constant pressure chamber 62 and a variable vacuum-power chamber 80.

The power assembly MA comprises a pair of circular plates 81, 82 and a ring-like flexible diaphragm generally designated "D," the inner marginal portion of the diaphragm being clamped between the peripheral marginal portions of said plates, and the outer marginal portion of the diaphragm being impinged in air-sealed relationship between the said casing flanges as shown. The diaphragm and plates aforesaid are assembled as a unit by suitable fasteners such as rivets 87. The central portions of the assembled plates are reinforced by circular hub discs 96, 97 between which, the corresponding central portions of the plates are clamped as by rivets 98. A central circular opening or recess 107 is provided through the disc 97 to produce a blind coaxial bore for an important purpose as will later appear.

Radially spaced inwardly from the rivets 87 is a pair of aligned openings 90, 91 through the plates 81, 82 respectively with the opening 90 through plate 81 being provided with a circular embossment 92 to produce a circular cavity 93 between the two plates to serve an important purpose to be later referred to.

A work performing member or plunger 110 is adapted for actuation by said power member MA, and slidably mounted on the plunger is a circular cup-shaped spring seat member 115 which is mechanically interconnected with an element of the valve mechanism CV for movement as a unit by a plurality of actuating pins 102 radially offset from the axis of the power member and operably projecting through the plates and discs thereof in air-tight sealed relation. A normally preloaded compression spring 116 encircles a portion of the plunger and reacts between the forward end wall 6 of the power cylinder casing and said spring seat member to urge the latter, the power member MA, and said valve mechanism in a releasing direction only to inactivate said motor.

The follow-up control valve mechanism generally designated "CV" is of new and improved construction and operation and comprises: an outer and an inner telescopically-related cylindrical element 120, 121 disclosed herein as a valve sleeve and a valve piston respectively. The valve sleeve 120 having an axial bore 124 extending from its inner end to a medial point substantially therein and a reduced diameter coaxial bore 126 extending from the other end to such depth as to provide a thrust wall 127 between the inner closed ends of said bores. Spaced from the inner end of the outer element is a cross-slot 129 through the wall thereof communicating with the bore 124, and longitudinally spaced rearwardly from said slot 129 is a plurality of fluid control ports 130 through the wall of the outer element in diametrically disposed relationship and communicating with the bore 124. A recess 131 is provided in the outer surface of the element 120 in rearwardly spaced relation to the control ports 130 and adjacent the outer end of the element 120 is an annular groove 133 formed in the exterior surface thereof for reception of a split-type stop ring 134. Transversely disposed of the element 120 is a bore 135 communicating with a portion of the bore 126 and through which a pin 136 is pressfitted to serve as a retainer for the forward end of a push rod "PR." The inner valve element 121 is a spool-type piston comprising a pair of longitudinally spaced annular lands 138, 139 which define a variable pressure chamber disclosed herein as an annular vacuum chamber 140 therebetween in constant communication with the slot 129, the outer ends of said lands terminating in reduced diameter extensions 141, 142 respectively. The free end of the extension 141 is loosely piloted in the blind bore 107 aforesaid to maintain substantially coaxial relationship between the control valve mechanism CV and the movable power assembly MA, and also to enable the free end of this extension to engage the confronting exposed surface at the bottom of the bore 107 for axial movement with the power assembly as a unit to produce the usual follow-up action of the control valve means CV, since the outer and inner valve elements 120, 121 slide relatively to each other to effect opening and closing of the control ports 130. Valve land 139 is spaced from the thrust wall 127 to provide an atmospheric valve chamber 144 therebetween with the latter chamber connected to the atmospheric-chamber 62 of the power cylinder via an axial passageway 145 coextensive with the inner valve piston 121 and a cross passageway 146 through the extension 141 which intersects the passageway 145. The valve land 139 is operable to selectively connect the control ports 130 to the atmospheric valve chamber 144 and to the vacuum-chamber 140 between said valve lands, said vacuum-chamber being subject to negative (vacuum) pressures at all times via slot 129 when the vacuum source (not shown) is effective to produce subatmospheric conditions, as for example, negative pressures within an associated internal-combustion engine intake manifold (not shown). Operably positioned within the valve chamber 144 is a normally preloaded helically formed compression spring 148 having one end bearing on the thrust wall 127 and the other end piloted by the extension 142 and reacting on the annular confronting face of the valve land 139 to bias the valve elements 120, 121 apart, and to accommodate their movement toward each other within the limits of the relative operating movement normally obtaining between the outer valve element and confronting side of the disc 97 to enable the pair of valve elements to move relatively to each other to control operative energization of the power cylinder PC as will appear. Encircling the forward portion of the outer valve element 120 is a valve housing designated "VH" comprising two semi-circular segments 150, 151 clamped around the outer valve element in air-tight sealed relationship by a pair of hex cap screws 152 projecting through holes 153 in a pair of laterally extending flanges or ears 154 forming the ends of the arcuate portion of the lower segment 151, into threaded engagement with internally threaded holes 156 formed in complemental lateral flanges or ears 157 forming the ends of the arcuate portion of the upper segment 150 to thus tightly clamp the two halves 150, 151 of the valve housing VH about the outer valve element in airtight sealed relation thereto. Formed in the inner curved surface of each of the segments 150, 151, is a rectangular-shaped arcuate cavity 159, 160 respectively, the cavity 160 in the lower segment 151 having continuous communication with the control ports 130, and the cavity 159 in the upper segment 150 having continuous communication with the slot 129. Aligned with the cavity 159 in the upper segment is an L-shaped boss 162 integral with the circular wall of said segment, said boss having a vertical passageway 163 communicating with said cavity and an angular passageway 164 intersecting the vertical passageway, and a rigid tube 165 pressed into the angular passageway to provide a vacuum inlet into the interior of the control valve means CV. The exterior of the lower segment circular portion is formed with a circular depending boss 167 having a coaxial passageway 168 communicating with the cavity 160. A rigid elbow-type tube 169 has its upper end pressed into the passageway 168 and the other end projects through the openings 91, 90 in the diaphragm plates 82, 81 respectively to connect the opposite side of the interior of the control valve mechanism CV to the vacuum power chamber 80, said connection including a ring-type pliant sealing member 170 encircling the exterior of the tube 169, and confined between the diaphragm plates within the cavity 93 is a contractible spring 171 encircling the outer periphery of the seal 170 to subject the seal to constant radially inward pressure to insure effective sealing between the tube and power chamber and at the same time accommodating limited relative movement between the tube and movable wall MA. The complemental semi-circular valve housings are each formed at their inner ends with an inturned semicircular flange 172, 173 respectively which in assembled relation provide an annular inturned flange 174 the inner side thereof being adapted to engage the inner end of the valve sleeve 120 and to be operatively engaged by the peripheral marginal surface on the confronting side of the valve land 138 to limit axial displacement between the pair of valve elements aforesaid under influence of spring 148. Thus, the flange 174 and valve land 138 coact to produce what may be termed a first pair of abutment-engaging portions of limiting means for establishing one of the extremes of the relative operational functions of the valve elements. The opposite side of the flange 174 is predeterminately spaced normally from the power member disc 197 to thus produce the second pair of abutment-engaging portions of said limiting means to define the other extreme of relative operational functions of said valve elements, said flange being adapted to continuously engage the rearwardly projecting free ends of the actuating pins 102 whereby movement of the outer valve element to open the control valve means CV actuates the pins 102 relatively to the diaphragm plates to move the spring seat member 115 and thereby additional compresses the spring 116 to provide increased tension reacting against the outer valve element which tension is progressively induced in accordance with the effective operating stroke of the movable wall MA as a measure of the pressure being exerted by said movable wall on the liquid in the hydraulic pressure chamber of the master cylinder HC. It should be noted here that during energization of the power cylinder PC, the spring 116 reacts only on the spring seat 115 and outer valve element to prevent power loss which would result should the movable wall be required to overcome the force of this spring as conventionally used in prior art devices.

Spaced forwardly from the outer end of the circular segment of the upper valve housing 150 is a recess 175 in the curved surface thereof registering with the recess 131 in the outer valve element, said recess receiving an element such as a steel ball 176 to lock the valve housing VH against movement with respect to the outer valve element.

A central opening 180 is provided in the rear end wall 30 of the power cylinder shell 66 in coaxial disposition with respect to the forward opening 29 in the shell 65. The marginal portion of opening 180 is formed with an outturned circular flange 181 radially closed inwardly into an external annular groove 182 formed in the outer cylindrical surface of a bearing collar 184 to make the collar rigid with the end wall 30. The interior of the collar is provided with inner and outer counterbores 185, 186 respectively in coaxial disposition to form medially thereof a pair of spaced annular shoulders 187, 188 and a longitudinal bore 189 interconnecting said shoulders, the latter bore serving as a bearing support for the rearwardly projecting exposed portion of the outer valve element 120 best demonstrated in FIGURE 2. Shoulder 187 is engageable by the rear or outer ends of the valve housing segments aforesaid to establish the control valve mechanism CV in its normally released position, and the other shoulder 188 is engageable by the split stop ring 134 carried by the outer valve element 120 to limit the operating stroke of the latter element. Another external annular groove 190 is provided on the collar 184 rearwardly spaced from the end wall 30 for receiving the forward annular retaining bead 191 of a conventional flexible dust boot 192.

The push-rod PR is preferably constructed of an outer section 59 and an inner section 196 having their confronting ends telescopically inter-threaded and a lock nut 197 on the externally threaded portion of section 196 secures the two sections as a unit in their axially adjusted position. The section 196 has its free end portion projecting into the bore 126 in engagement with the thrust wall 127, and terminates in a dome-shaped head 199 with an annular space 200 adjacent thereto through which the securing cross pin 136 projects to act as a retainer for that section of the push-rod therefore the outer section, and thereby provides a universal action between the dome-shaped head and thrust wall, the other section 59 of the push-rod has its free end terminating as an eye rod end 58 which is pivotally connected to an operator-operated member disclosed herein as a suspended pedal "P" having a foot pad 60, by means of the shouldered pin 57 whereby movement of the pedal on its support shaft 54 mounted on the bracket 55, simultaneously moves the valve sleeve 120 to operate the control valve means CV to its open positions for power-activation of the power cylinder. An exteriorly knurled annular flange 203 is formed integral with the medial portion of the push-rod section 196 in normally spaced relation from the outer end of the valve sleeve 120, said flange being engaged by an annular bead 204 forming the smaller open end 205 of the dust excluding boot and through which the rod section 196 projects to prevent foreign matter from damaging the bearing surfaces between the collar support for the valve sleeve 120 and between the thrust wall and engaging dome head best demonstrated in FIGURE 1.

An optional feature of construction associated with the bearing collar and control valve sleeve 120 is a longitudinal surface groove 207 in the exterior surface of the sleeve, and a pin 208 pressfitted through a radially disposed hole 209 through the wall of the collar and medially positioned between the shoulders 187, 188, into engagement with said groove to prevent relative rotation between the valve sleeve and collar while accommodating relative sliding movement of the element.

A rigid vacuum-inlet tube 240 projects through the cylindrical wall of shell 66 at 241, the inner projecting portion 242 receives one end of substantially a convolution of flexible conduit 243 and the other end of said conduit is attached to the tube 165 leading from the upper valve housing segment 150 whereby vacuum inlet to the arcuate cavity 159 and relative operating movement of the control valve mechanism CV with respect to the power cylinder through the full operating stroke of the movable wall MA are provided. The outer projecting portion 244 of the tube 240 receives one end of a flexible conduit and the other end is connected to a tubular fitting threaded, for example, into the wall of the engine intake-manifold (not shown), thereby completing the vacuum connection to the control valve housing VH, as shown in FIGURES 1 and 2.

A cotter pin 260 is inserted through diametrically disposed holes 261 adjacent the end of the tube 169 extending into the power chamber 80 to prevent this tube from becoming disconnected from the movable wall MA as a result of fortuitous separation of said wall and control valve assembly CV in excess of the normally required operating clearance therebetween. If the tube should become disconnected from the movable wall such would render the power cylinder inoperative. Such a separation of the above two components sufficient to disconnect the tube 169 from the movable wall MA is quite unlikely since release of the control valve sleeve 120 enables the spring 116 to also act on the movable wall resulting in the movable wall and control valve assembly moving as a unit toward their respective released positions shown in FIGURE 1. The cotter pin serves as a safeguard against any possibility of the tube 169 becoming separated from the diaphragm plates 81, 82, and therefore, limits the extent of displacement between these parts so that the tube 169 slidably projects at all times through the plate openings 90, 91.

*Operation*

The operation of my improved follow-up control valve mechanism CV will be apparent from the foregoing description but may be summarized as follows:

Assuming that the valve sleeve and piston 120, 121 respectively are in their normally released positions wherein the pressures in the motor chambers 62, 80 are balanced to inactivate said motor, and the power member MA thereof is disposed in its normally released position. with the engine running, sub-atmospheric (negative) pressure is produced within the intake-manifold (not shown) which is conveyed through conduits 245, 243, tube 165, arcuate cavity 159, slot 129, to evacuate air from the annular valve chamber 140 on the control valve piston 121 which conditions the valve mechanism CV for operation to control operative energization of the power member MA as is understood.

In the normally released disposition of the control valve sleeve and piston 120, 121 portrayed in FIGURES 1 and 2, the atmospheric and power chambers 62, 80 respectively are vented to atmosphere, the power chamber being vented via tube 169, arcuate cavity 160, control ports 130 disposed to the right of annular valve land 139 in substantially half-open condition communicating with valve chamber 144, passageways 145, 146, atmospheric chamber 62 and thence to atmosphere via the air filter device AF, and, as previously stated the chamber 62 is in continuous communication with the atmosphere via said filter device. Accordingly, the power cylinder may be termed "air-suspended" when the movable power member MA and related parts are in their respective normally released positions as shown in FIGURE 1.

Initial depression of its pedal P to the first dashed line position of FIGURE 1 simultaneously moves the valve sleeve and piston 120, 121, power member MA, and plunger 110 to the positions shown in FIGURE 5 wherein the master brake cylinder HC generates a resistance to further movement of the above components simultaneously effected by the initial operator force on the pedal P transmitted to said parts by the valve spring 148 without modulating the preloaded status of the latter. Upon the operator applying increased pressure to the pedal P following such initial application thereto, the valve sleeve 120 is displaced relatively to the valve piston 121 from normal "off" position, which relative displacement is accommodated by yielding of the valve spring 148 induced by the resistance of the master cylinder fluid-displacing parts reacting on the plunger 110. Said relative displacement being provided by the predeterminately spaced normal disposition of the inner flanged end 174 of the valve housing VH with respect to the power member MA best demonstrated in FIGURE 2, it being recalled here that the forward extension of the valve piston 121 abuts the same side of the power member MA whereby the valve piston 121 moves in unison with the power member under influence of the valve sleeve 120 acting through valve spring 148 at all operating positions of the valve mechanism CV. When the normal operating movement of the valve sleeve prevails, which corresponds to the relative disposition aforesaid of the valve sleeve 120 with respect to the power member MA, the valve mechanism CV may be said to be fully closed or "off," that is to say, the motor chambers 62, 80 are vented to atmosphere to provide balanced pressures within said chambers. The aforesaid relative movement of the valve sleeve 120 moves the control ports 130 into increasing exposure to the annular vacuum-chamber 140 after first cutting off communication of these ports from the atmospheric valve chamber 144 thereby causing evacuation of air from the power chamber 80 via the tube 169 and connected arcuate cavity in the lower half of the valve housing VH thus enabling the atmospheric pressure in chamber 62 acting across the opposite side of the power member MA to operatively energize the same in a thrust-transmitting direction as demonstrated in FIGURE 5.

Upon release of operator force from the pedal P, the valve elements 120, 121 return to their normal "off" positions shown in FIGURE 1 under influence in part of the reaction from the spring 116 on the spring seat 115 which continuously transmits the force of this spring via pins 102 to the valve sleeve 120 to reset the latter in its normally released position. This resetting of the valve sleeve 120 to its normal position and re-establishment of the relative disposition of the valve sleeve and piston 120, 121 respectively are effected by the combined reactions from the springs 116, 148. Spring 116 continuously opposes displacement of the valve sleeve 120 from its normally released position shown in FIGURE 1 and so does spring 148, therefore, these two springs serve to oppose pedal actuation of the valve sleeve to place the valve mechanism CV in operating "on" position for power-activation of said motor PC.

It is important to note here that the present novel follow-up valve mechanism CV is characterized by a unitary construction completely independent of the power assembly MA controlled thereby. This independent disposition being provided by novel slidable support of the valve mechanism as a unit on a portion of the motor casing, by utilizing that portion of the valve sleeve disposed rearwardly of the valve housing VH, and which is acted on by the pedal P, thereby providing unison and relative sliding movements of the principal valve elements 120, 121 to effect a sensitized follow-up action thereof, and the ever present reaction from springs 116 and 148 to oppose operation of the pedal P contributes to a very smooth operation of the valve mechanism CV in accordance with the operator force applied to the pedal P.

Should the source of pressure fail or be inadequate, the operator can effect a "straight-through" assist or full operation of the plunger 110 by merely applying sufficient force on the pedal P to bring the inner end 174 of the valve housing and/or sleeve into engagement with the confronting surface portion on the power member MA.

Moreover, it should be noted that spring 116 continuously reacts on the valve sleeve 120, and on the power assembly MA in a releasing direction only thereby utilizing the full pressure differential force in the motor PC for operation of the plunger 110 rather than, as in prior art control valve mechanisms, dissipate some of the power force in overcoming the reaction from the conventional return spring for the power piston or diaphragm.

A further feature noteworthy in the present valve mechanism CV is the provision of the usual operating relationship of the valve working land 139 and control ports 130 wherein there is provided the "off," "lapped," and "on" positions of control, the "lapped" position being effective to stabilize the power member MA in any operating position by maintaining substantially a uniform force on the pedal P at such operating position wherein the valve mechanism may be held "on" with minimum operator force required.

*Modified Fluid Connection to Power Chamber— (Figure 7)*

FIGURE 7 illustrates a modified air-vacuum connection between the power control valve and power diaphragm in which corresponding parts are designated by like reference characters distinguished, however, by the addition of the suffix "*a*" to each. In this modified embodiment a rigid elbow-type tubular fitting 270 is substituted for the fitting 169 of the first embodiment in spaced parallel relation with respect to the diaphragm plate 82. Another rigid elbow-type tubular fitting 271 has one end inserted into an opening 272 through both of the plates and secured thereto as by welding, in communication with the vacuum power chamber 80a with its free end angularly disposed in parallel spaced relationship with respect to the free end of the fitting 270. The free ends of said fittings are interconnecting by a flexible conduit 273 preferably of arcuate configuration to enable the control valve assembly CV$^a$ to have its required relative operating movement with respect to the diaphragm plates 81, 82 to control operation of the booster motor as is understood. In this connection it should be noted that the fitting 271 replaces the openings 90, 91, circular embossment 92, ring seal 170, and spring 171 associated with the diaphragm plates in the first embodiment (see FIGURES 1, 2 and 3).

In operation, the flexible characteristic of the conduit 273 enables the control valve sleeve 120a to axially move relatively to the valve piston 121a and connected diaphragm plates to control operation of the movable power diaphragm MA$^a$, and the arcuate contour of this conduit tends to prevent relative rotational movement of the control valve means CV$^a$ with respect to the movable wall MA$^a$, and therefore counterbalances the turning effect of the convolution of conduit 243a connecting the opposite side of the control valve to the rigid fitting 240a secured to and projecting through the cylindrical wall of the power cylinder shell 66. In this manner, the control valve assembly is stabilized against rotation in substantially the position shown in FIGURE 7 thus eliminating the need for the groove and pin connection 207, 208 used in the first embodiment, FIGURES 1–6.

*Modified Control Valve Structure and Operation— (Figures 8 and 9)*

Figure 8:
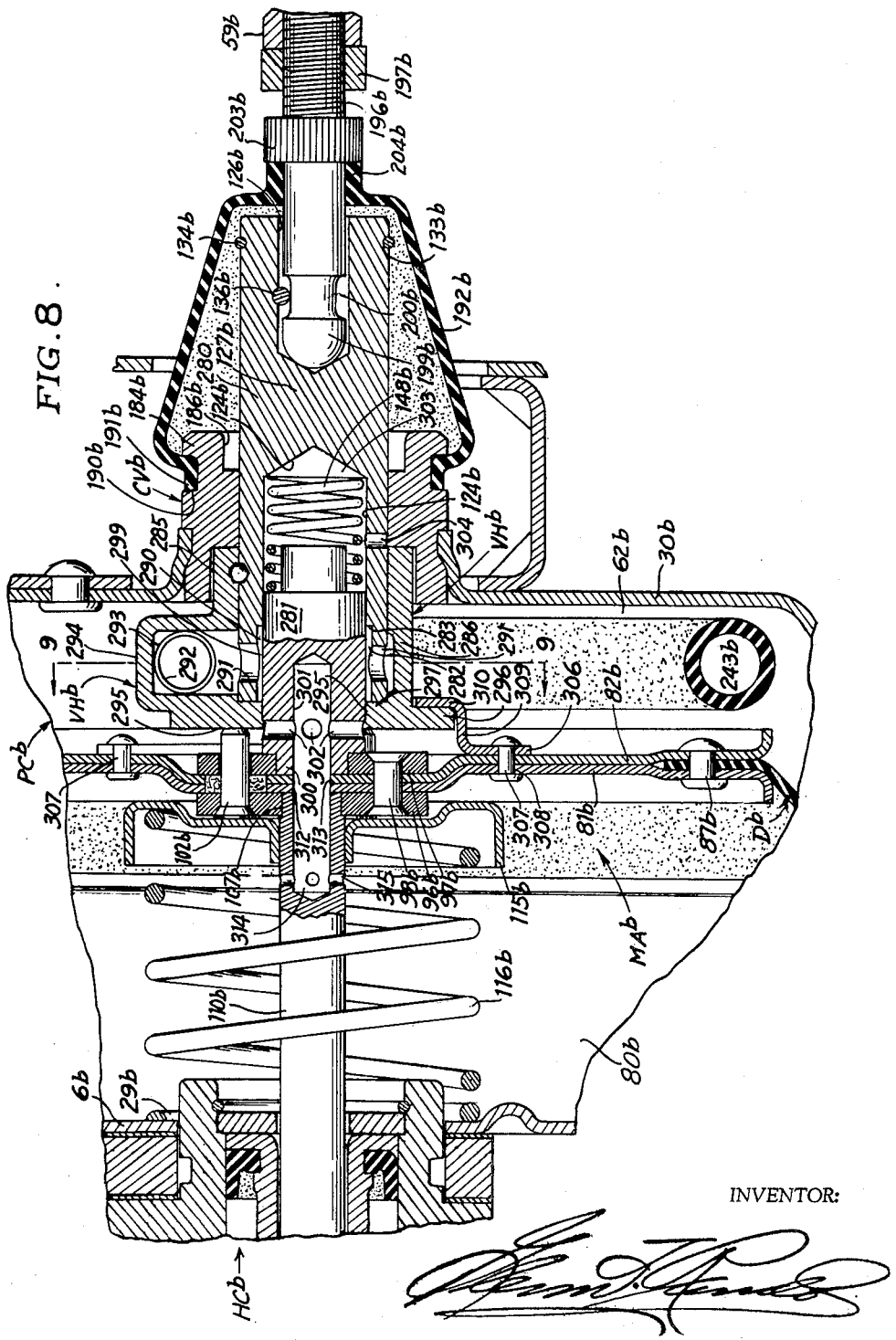
FIGURE 8 is another modified form of the valve mechanism wherein the power member of the motor is connected with the interior of said mechanism via a longitudinal passageway in a portion of the power member and the inner valve element.

Depicted in FIGURES 8 and 9 is modified control valve mechanism CV$^b$ which utilizes a passageway coaxially disposed within the inner valve element for connecting the power chamber of the power cylinder to the interior of the control valve assembly in lieu of the rigid elbow tube 169 of the first embodiment, otherwise the structure of this modification is in the main similar to that of the first embodiment.

The modified structure comprises: outer and inner interfitting relatively movable cylindrical elements 280, 281 respectively, more specifically designated a sleeve and piston respectively, the sleeve element having a longitudinal bore 124b extending from the inner end to a medial point substantially therein and a reduced diameter coaxial bore 126b extending from the other end to such depth as to provide a thrust wall 127b between the closed ends of said bores. A counterbore 282 is provided in the forward end of the bore 124b to provide an internal annular shoulder at 283. Encircling the valve sleeve 280 is a valve housing VH$^b$ comprising two semicircular upper and lower segments 285, 286 respectively securely clamped about the valve sleeve in airtight sealed relation thereto by means of a pair of hex cap screws 152b, projecting through holes 153b provided in a pair of laterally extending flanges or ears 154b integral with the ends of the semicircular portion of the lower segment 286, into threaded engagement with threaded holes 156b provided in complemental lateral flanges or ears 157b integral with the ends of the semicircular portion of the upper segment 285 to thus tightly clamp the two halves 285, 286 of the valve housing VH$^b$ about the valve sleeve 280 to produce a unitary assembly thereof. Formed in the inner curved surfaces of the valve housing segments 285, 286, are semicircular channels 288, 289 respectively merging at their mating surfaces on the lateral flanges 154b, 157b to produce in assembly an internal annular channel 290 encircling the outer cylindrical surface on the valve sleeve 280. This annular channel is in constant communication with the interior of the counterbore 282 via a plurality of ports 291 through a circularly aligned wall portion of the outer valve element, and with the interior of the valve housing via a rigid curved tube 292 having one end secured in a horizontal bore 293 communicating with passageway 163b provided within an upstanding elongated surface boss 294 integral with the upper housing segment 285, the other downturned end of the tube receives one end of a convolution of flexible conduit 243b to connect the vacuum source (not shown) to the interior of the control valve mechanism CV$^b$. The inner ends of the upper and lower valve housings 285, 286 respectively are each made with a circularly aligned inner semicircular flange to provide in assembly an annular valve land 295, and an outer semicircular flange to provide in assembly an annular flange 296. The inner face of the valve land intimately engages the inner end of the valve sleeve 280 to effect an airtight seal therebetween and which is longitudinally spaced from the internal annular shoulder 283 to provide an annular vacuum chamber 299 in continuous communication with the annular channel 290 via the ports 291. The inner ends of the valve housing segments are normally predeterminately spaced from the diaphragm hub disc 97b to provide a pair of abutment-engaging portions to define the relative operating movement between the valve elements 280, 281, said ends being engaged by the free ends of the actuating pins 102b. The inner valve element 281 comprises: a shouldered reduced diameter end portion at 300 which is pressfitted into the disc opening 107b and welded, if necessary, to provide a rigid assembly of the disc and inner valve element for movement as a unit, a longitudinal bore 301 extends from the inner end of the element a predetermined depth, and intersecting this bore is a plurality of ports 302 through the wall of the bore and disposed in circular alignment with one-half of the area of each port normally covered by the land 295 to isolate the annular vacuum chamber 299 and place the bore 301 in communication with the atmosphere via the exposed other half of the ports 302 whereby relative movement of the outer valve element 280 with respect to the inner valve element selectively connects the ports 302 to atmosphere and to the vacuum source as is understood. The other end of the inner valve element is identical to the first disclosure (see FIGURE 1) and predeterminately normally spaced from the thrust wall 127b to form an atmospheric chamber 303 therebetween, the latter chamber serving to house the valve return spring 148b with one end thereof bearing on the end of the inner valve element and the other end reacting on the thrust wall 127b to separate the pair of valve elements 280, 281 toward normal "off" position, said atmospheric chamber being vented to the atmosphere via port 304 to prevent compressive effects between the valve elements when moved relatively to each other to control operative energization of the power cylinder PC$^b$.

A circular stop member 306 is provided on the rear face of the diaphragm plate 82b and secured rigid therewith as by rivets 307 inserted through aligned holes 308 through the peripheral marginal portion of the stop member and diaphragm plates 81b, 82b. The central circular portion of the stop member is formed with an outwardly extruded circular wall embossment 309 having an inturned annular flange 310, the wall and flange having a cutout 311 through which the valve housing boss 294 may freely move when the control valve means CV$^b$ are operated. The confronting vertical edges of the cutout cooperate with the side walls of the boss 294 to prevent relative rotational movement of the valve housing body VH$^b$ with respect to the power diaphragm assembly MA$^b$ to thus maintain the control valve assembly in correct working relationship to the convolution of flexible conduit 243b which enables unrestricted reciprocable movement of the power assembly MA$^b$ in applying and releasing the vehicle brakes. This connection between the valve housing VH$^b$ and diaphragm plates is the equivalent of the groove 207 and pin 208 connection disclosed in the first embodiment (see FIGURE 2). The inturned flange 310 is engageable by the outer surface on the external flange 296 to limit axial separation of the inner and outer valve elements 280, 281 under influence of the valve return spring 148b and thus establishes the limits of relative operating movement between said valve elements as is understood. Thus, flanges 310, 296 coact to provide another pair of abutment-engaging portions to produce with the previously mentioned pair, the limiting means defining the relative operational functions of the valve mechanism CV$^b$.

Coaxially disposed with respect to the longitudinal bore 301 are holes 312, 313 through the central portion of the diaphragm plates 81b, 82b respectively and a longitudinal bore 314 extends from the secured shouldered secured end of the pressure-transmitting member 110b a limited depth, and radially disposed ports 315 formed in the member 110b communicates with the bore 314 and power chamber 80b whereby the latter chamber is connected to the opposite side of the control valve means CV$^b$, it being noted that the radial ports 315 are spaced ahead of the movable spring seat member 115b to prevent closure thereof when the seat is actuated relatively to the movable wall MA$^b$.

In operation, the normally released disposition of the parts is shown in FIGURE 8 wherein, with the engine running, reduced pressure (vacuum) produced in the engine intake-manifold (not shown) is conveyed through conduit 243b, tube 292, annular channel 290, ports 291 to evacuate air from the annular vacuum chamber 299 between the outer and inner valve elements 280, 281 respectively which conditions the control valve mechanism CV$^b$ for operation to control operation of the power cylinder PC$^b$ as explained in connection with the first embodiment.

In this normal disposition of the parts aforesaid as shown in FIGURES 8 and 9, the atmospheric and vacuum-power chambers 62b, 80b respectively are vented to atmosphere, the power chamber being vented via ports 302, bore 301, openings 312, 313, bore 314 and radial ports 315, the ports 302 being selectively communicable with the atmospheric chamber 62b of the power cylinder which in turn is vented to the atmosphere via the air filter device AF$^b$ in the same manner as the first disclosure previously described. Accordingly, the power cylinder PC$^b$ may be termed "air-suspended" when the movable power assembly MA$^b$ and connected parts are in their respective normally released positions portrayed in FIGURE 8.

Initial depression of the pedal to its first dashed line position of FIGURE 1 (first embodiment) would in the present instance simultaneously move the outer and the inner valve elements 280, 281 respectively, the movable power member MA$^b$ and connected pressure-transmitting member 110b to positions corresponding to those shown in FIGURE 5 of the first embodiment to initially actuate the master brake cylinder HC and thereby produce resistance to pedal movement of the parts aforesaid under influence of the spring 148b in normally preloaded condition, to induce relative displacement of the valve elements 280, 281 to operating "on" position under influence of additional operator force applied to the brake pedal P.

The aforesaid simultaneous actuation of the parts is provided by the normal preloaded status of the control valve return spring 148b which is characterized identically to that of the same spring in the first embodiment (FIGURES 1–6).

The present modified arrangement of the valve mechanism CV$^b$ has the same operational relationship with the reactive and return spring 116b acted on by the movable spring seat 115b by the actuating pins 102b bearing on the forward end of the valve housing VH$^b$, and its connection to the pedal mechanism P as already described in the main embodiment, FIGURES 1–6.

Aside from simplifyng the connection of the valve control housing to the power chamber 80b, the present valvular modification is especially suited for incorporation in a power cylinder of the collapsible bellows-type comprising a stationary head and a movable head since the exposed movable head presents no sealing problems with respect to the movable parts of the valving and their connection of the pedal mechanism.

This modified control valve has the usual follow-up action, since the valve piston 281 is connected to the movable power diaphragm MA$^b$ to move as a unit and the valve sleeve 280 is actuated relatively to the valve piston in response to operating the brake pedal P to control operation of the power cylinder PC$^b$. This follow-up action tends to overtake and "lap" the ports 302 and the valve land 295 unless brake-applying movement of the pedal continues. Whenever the operator halts pedal movement, the inner valve element 281 moves sufficiently in the direction of pedal movement to place the land 295 in circular alignment with the ports 302 thereby closing the latter ports since the diameter of these ports is slightly less than the width of the valve working land. This "lapped" condition of the control valve CV$^b$ is termed the brake "holding" position which results from substantial stabilization of operator and booster motor input forces required to effect a desired brake application.

If the operator desires to apply his force, after the full power force has been developed in the power cylinder PC$^b$, or, if there is a power failure, such direct physical force can be exerted on the plunger 110b through the inner end of the valve sleeve 280 engaging the power member MA$^b$ which operation takes up all of the relative operating movement therebetween and transmits the physical force directly to the thrust-transmitting member 110b.

The simplicity and economy of the disclosed valve mechanism CV, and its independent mounting, if desired, within the motor casing to enable servicing without having to replace part or all of the associated power assembly MA controlled thereby, make it most desirable as a control means for pressure differential operated motors utilized to operate in part motor vehicle brakes and/or steering apparatus characterized by a follow-up sequence of control between an operator-operated member and a power-activated member, and wherein the operator member is operable to automatically effect a "straight-through" application of operator force to the device controlled by such motors.

Although the embodiments of my invention disclosed herein are well calculated to fulfill the objects stated above, it will be understood that I do not wish such to be limited to the exact construction and/or arrangement of parts shown, since it is evident that modifications, variations, changes, and substitutions may be made therein without departing from the proper scope or fair meaning of the subjoined claims.

Having thus described my invention, I claim:

1. In a control valve mechanism adapted for use to control a power member movable from a normal position under influence of a pressure differential, said mechanism having a pair of complementary valve elements, one of which is displaceable relatively to the other from normal position, a source of pressure different from atmosphere communicating with the one of said valve elements, an annular variable pressure chamber between portions of said valve elements in continuous communication with said source, an atmospheric chamber in the one valve element coaxially disposed in spaced relationship to said variable chamber a pair of cooperable fluid-controlling portions on said valve elements respectively, to selectively connect one of said portions to said variable chamber and to said atmospheric chamber, a fluid connection between said one fluid-controlling portion and the power member, a normally preloaded spring reacting between said valve elements to establish the same in relative normal position, another normally preloaded spring continuously reacting on said one valve element in cooperation with said first-named spring to establish the power member in normal position, the improvement which comprises: means on the other valve element in continuous follow-up engagement with the power member; a support extension fixed with respect to said power member for slidably receiving a different portion on said one valve element whereby both of said valve elements are operatively mounted as a unit independently of said latter member; limiting means operatively disposed between said valve elements to establish their normal position; normally spaced abutment-engaging portions on said one valve element and the power member respectively to define the relative displacement of said valve elements; an operator-oprated member adapted to act directly on said one valve element to effect said relative displacement thereof; and work-load resistance induced in response to initial movement of said power member under operator-actuation thereof in unison with said valve elements in normal position as a function of the first-named spring in normally preloaded status, to oppose such unison movement, and thereby cause said first-named spring to yield to accommodate said relative displacement of said valve elements out of normal position.

2. In a control valve mechanism adapted for use to control a power member movable within a cylindrical casing relatively from normally released position under influence of a pressure differential, said mechanism having inner and outer telescopically-related cylindrical valve elements relatively displaceable out of normally released position for controlling operation of said power member with the outer element displaceable under operator-actuation, the improvement which comprises: a pair of coaxially disposed blind bores formed in opposite ends respectively of the outer valve element with one of said bores slidably receiving the inner valve element in airtight sealed relation thereto; a thrust wall defining the opposed blind ends of said coaxial bores in the outer valve element; an atmospheric valve chamber disposed between the thrust wall and confronting end of the inner valve element; an axial bore coextensive with said inner valve element for connecting said atmospheric chamber to atmosphere; limiting means including a first pair of complemental abutment engaging portions operatively positioned respectively on said power member and the outer valve element and a second pair of abutment-engaging portions on said valve elements respectively, for defining the relative displacements thereof; a normally preloaded spring operably disposed within said atmospheric chamber to react between said thrust wall and confronting end of the inner valve element to bias them apart to normal relative positions and accommodate their relative displacement toward one another within the limits of the latter; an extension on said inner valve element in continuous follow-up engagement with said power member for movement as a unit under influence of operator-actuation of the outer valve element; another normally preloaded spring reacting continuously on the outer valve element in cooperation with said first-named spring to establish the normally released positions of said power member and valve elements; tubular conduit means for interconnecting one side of the outer valve element with a source of pressure different from atmosphere, and the opposite side thereof to the power member aforesaid, whereby relative displacements of said outer valve element with respect to the inner valve element and the outer valve element with respect to the power member, are accommodated; an operator-operated member adapted to act directly on the thrust wall in the outer valve element to effect said relative displacement thereof; work-load resistance opposing unison movement of said valve elements and power member as a function of the preloaded status of said first-named spring, generated in response to initial operator-actuation of said operator-operated member, thereby inducing said relative displacement of the outer valve element upon yielding of said first-named spring under additional operator-actuation; cooperating fluid control means incorporated between said valve elements to place said source in communication with said power member via said tubular conduit means; and complemental means on the valve mechanism and associated with said casing respectively for slidably supporting said mechanism as a unit independently of the power member.

3. A control valve mechanism constructed in accordance with claim 2 wherein said tubular conduit means is a rigid tube having one end fixed with respect to the outer valve element, and the other end slidably projecting through the power member in airtight sealed relationship thereto.

4. A control valve mechanism constructed in accordance with claim 2 wherein said tubular conduit means is a flexible conduit having one end communicating with the outer valve element and the other end connected to the power member.

5. A control valve mechanism constructed in accordance with claim 2 wherein the outer valve element includes a pair of diametrically disposed longitudinally spaced openings through the wall defining the inner axial bore, said openings cooperating respectively with a pair of annular lands on the inner valve element longitudinally spaced to provide an annular vacuum-chamber therebetween whereby said vacuum-chamber is in continuous communication with one of the openings in the outer valve element communicating with said source, and one of the annular lands is adapted to selectively control communication of the other openings with respect to said vacuum-chamber and to said atmospheric valve chamber in response to relative displacement of the outer valve element with respect to the inner valve element.

6. A control valve mechanism constructed in accordance with claim 5 including a valve housing mounted on said outer valve element to produce a unitary assembly, said valve housing comprising: a sleeve segment telescopically disposed on the outer valve element in air-tight sealed relationship; a pair of circumferentially spaced cavities in the inner cylindrical surface of said sleeve segment, one of said cavities having continuous communication with the opening in the outer valve element connected to said source, and the other cavity having continuous communication with the control port in said outer valve element; a pair of embossments integral with said sleeve segment and radially aligned with said cavities respectively; a passageway in each of said embossments in communication respectively with each of said cavities; another passageway in each of said embossments intersecting respectively the first-named passageways whereby said opening and control port are connected to said source and to the power member respectively.

7. A control valve mechanism constructed in accordance with claim 6 wherein said sleeve segment comprises two semicircular sections with each section incorporating one of said cavities and one of said embossments; a pair of oppositely disposed flanges integral with each of said sections, said pairs of flanges having complemental confronting surfaces flush with the ends of the semicircular sections; registering holes through each pair of confronting flanges with one hole in each pair being threaded; and a threaded fastener projecting through each of the unthreaded holes in each pair of holes into threaded engagement with the registering threaded holes respectively in each pair of flanges to clamp both sections in airtight sealed relation on the outer valve element to produce a unitary assembly therewith.

8. A control valve mechanism constructed in accordance with claim 5 in which the outer valve element is provided with an external annular groove adjacent its outer end, and a split-type stop ring engaging said groove is adapted to abut a confronting portion on said casing to establish the normally released position of the valve mechanism.

9. A control valve mechanism constructed in accordance with claim 8 including a longitudinal surface channel terminating at the outer end of said outer valve element; an opening associated with said complemental means; and a pressfitted pin through said opening projecting into said surface channel to prevent relative rotational movement between the outer valve element and casing.

10. In a control valve mechanism adapted for use to control a power member movable within a cylindrical casing relatively from normal position under influence of a pressure differential, the improvement which comprises: inner and otuer telescopically-related realtively displaceable valve elements slidably supported in part as a unit on said power member to control its operation; a pair of coaxially bored blind cavities is provided in opposite ends respectively of the outer valve element with the inner cavity being adapted to slidably receive the inner valve element in airtight sealed relation; a thrust wall for separating the inner confronting ends of said co-axial cavities; a blind axial bore in the forward end portion of said inner valve element; a plurality of radially disposed control ports through the wall of said last-named bore in spaced relation with respect to the open end of said bore; a passage through the power member in coaxial position with respect to the open end of the blind bore in the forward end portion of said inner valve element; an atmospheric valve chamber disposed between said thrust wall and confronting end of the inner valve element; a port through the wall of the outer valve element communicating with the atmospheric valve chamber; limiting means including two pairs of complemental abutment engaging portions on the valve elements respectively and on the outer valve element and the power member respectively for defining the relative displacement of said valve elements and the normal relative portions thereof; a normally preloaded compression spring reacting between the inner valve element and thrust wall to establish the valve mechanism in normal position; another normally preloaded compression spring continuously reacting on the outer valve element in cooperation with the first-named spring to establish the normal position of said power member; a mechanical connection between the movable power member and inner valve element enabling their movement as a unit in both directions; another atmospheric chamber defined by one side of said power member; an annular vacuum-chamber provided between portions of said valve elements; an internal annular working land on said outer valve element defining one end of said vacuum-chamber for selectively connecting the control ports in the inner valve element to the last-named atmospheric chamber and to said vacuum chamber to control operation of the power member, said working land being normally disposed to connect a portion of the area of said control ports to atmosphere; a second port through the wall of said outer valve element interconnecting said source with said vacuum chamber; and an operator-operated member acting directly on said thrust wall in the outer valve element to displace the same relatively to said inner valve element as a function of a work-load resistance generated to oppose movement of said power member under influence of the preloaded status of said first-named spring induced by initial operation of said operator member.

11. In control valve mechanism for use with a fluid pressure activated motor having a fluid chamber enclosure and a movable wall dividing said chamber into opposing fluid pressure chambers, a source of pressure different from atmosphere communicating with said mechanism, an inner valve element interfitting an outer valve element which are cooperable in normal position to balance pressures in said chambers, and relatively displaceable to relative operating positions to establish differential pressures in said chambers to move said wall, the improvement which comprises; limiting means effective between said valve elements and between said outer valve element and said movable wall to define the normal position of said valve elements; a normally preloaded spring reacting between said valve elements to bias them toward normal position; a fixed member; spring means including a normally preloaded spring reacting on said fixed member and continuously biasing said outer valve element to assist the first-named spring to establish said valve elements in normal position; and an operator-operated member operable from a normally released position, and which is adapted to act on said outer valve element to effect said relative displacement of the valve elements in opposition to said spring means and said first-named spring, said spring means being characterized by progressively increasing reaction on said operator member in accordance with the operating position thereof from normal position.

12. In control valve mechanism for use to control a power member movable from normal position under influence of a pressure differential, with an operator-operated member having a normally released position, and a source of pressure different from atmosphere communication with said mechanism, and a pair of cooperating telescopically-related spring-loaded inner and outer elements coaxially disposed with respect to the axis of said power member in operative follow-up association therewith to control the same, said elements having cooperating fluid-controlling portions therebetween, and which are relatively displaceable from normal position wherein equivalent pressures are established on opposite sides of said power member, to relative operating positions whereat differential pressures are effective on opposite sides of said power member to move the same, in response to operator-actuation of said outer valve element yieldably opposed by said spring load, the improvement which comprises: a fixed member; spring means including a normally preloaded spring reacting on said fixed member and continuously biasing said outer valve element, to produce progressively increasing resistance to movement thereof during relative displacement of said pair of valve elements in accordance with the operating position of said operator member; and mechanical means interconnecting said outer valve element with said spring of said spring means to augment said resistance thereof.

13. In control valve mechanism for use to control a power member movable from normal position under influence of a pressure differential, with an operator-operated member having a normally released position and a pair of cooperating inner and outer valve elements relatively displaceable from normal position wherein pressures are balanced on opposite sides of said power member, to relative operating positions wherein differential pressures are effective on opposite sides of said power member to move the same, in response to operator-actuation of one of said valve elements, the improvement which comprises: a valve housing encircling at least a portion of the other valve element to move as a unit; a pair of circumferentially spaced cavities disposed between said housing and outer valve element, one of said cavities having continuous communication with a source of pressure different from atmosphere, and the other cavity having continuous communication with one side of said power member; a control port in the outer valve element normally connecting said other cavity to atmosphere to balance pressures on opposite sides of said power member; a fluid opening in the outer valve element interconnecting said one cavity with the inner valve element; a fluid connection between said one side of the power member and said other cavity; a working land on said inner valve element adapted to selectively isolate said control port from atmosphere and place the same in communication with said source, and to connect said control port to atmosphere and isolate said source from communicating therewith; and a normally preloaded spring reacting between said valve elements to establish said normal position thereof.

14. In control valve mechanism for use to control a power member movable from normal position under influence of a differential pressure, with an operator-operated member having a normally released position, and a pair of interfitting valve elements providing an inner and an outer element respectively and which are relatively displaceable from normal position wherein equivalent pressures are effective on opposite sides of said power member, to relative operating positions wherein differential pressures are effective on opposite sides of said power member to move the same; a normally preloaded spring adapted to bias said valve elements toward normal position; a pair of spaced fluid chambers defined by cooperating positions of said valve elements, one of said chambers being connected to a source of pressure different from atmosphere, and the other chamber normally interconnecting one side of said power member with atmosphere; a pair of cooperating working surfaces on said elements respectively, and which are adapted to selectively connect said one chamber with the one side of said power member upon isolating the other chamber therefrom, to produce differential pressures on opposite sides of said power member, and to connect said other chamber to the one side of said power member upon isolating the one chamber therefrom to produce equivalent pressures on opposite sides of said power member; and means interconnecting the outer of said valve elements with said operator member to move as a unit in opposition to said spring.

15. In control valve mechanism for use in controlling a power member movable from normal position under influence of a pressure differential, with an operator-operated member having a normally released position, the improvement which comprises: a movable valve housing; a sleeve fixed in said housing to move as a unit therewith; a valve piston slidable in said sleeve from normal position with respect thereto; a pair of longitudinally spaced ports in said sleeve; a pair of coaxial fluid chambers disposed between said sleeve and valve piston for selective communication with one of said ports without interrupting communication of the other port with one of said chambers; a source of pressure different from atmosphere communicating with said other port; a fluid connection between said one port and one side of said power member; a passageway continuously venting the other chamber to atmosphere; a working surface on said valve piston adapted to selectively connect the one port to said chambers to produce pressure differential and balanced pressures on said power member respectively; a normally preloaded spring operably disposed between said sleeve and valve piston to bias them toward normal position; and means interconnecting said operator member with said valve housing and sleeve to move the same as a unit relatively to said valve piston in opposition to said spring.

References Cited in the file of this patent

UNITED STATES PATENTS

| | | |
|---|---|---|
| 2,331,238 | Schnell | Oct. 5, 1943 |
| 2,517,005 | Mac Duff | Aug. 1, 1950 |
| 2,685,171 | Price | Aug. 3, 1954 |
| 2,690,740 | Hupp | Oct. 5, 1954 |
| 2,770,949 | Randol | Nov. 20, 1956 |
| 2,972,339 | Randol | Feb. 21, 1961 |